US005694491A

United States Patent [19]
Brill et al.

[11] Patent Number: 5,694,491
[45] Date of Patent: Dec. 2, 1997

[54] METHODS AND APPARATUS FOR ASSESSING THE VISIBILITY OF DIFFERENCES BETWEEN TWO IMAGE SEQUENCES

[75] Inventors: Michael Henry Brill, Morrisville, Pa.; Jeffrey Lubin, Middlesex, N.J.

[73] Assignee: David Sarnoff Research Center, Inc., Princeton, N.J.

[21] Appl. No.: 668,015

[22] Filed: Jun. 17, 1996

Related U.S. Application Data

[60] Provisional application No. 60/014,271 Mar. 29, 1996.
[51] Int. Cl.[6] .................................. G06T 5/00; G06T 7/00
[52] U.S. Cl. ........................... 382/260; 382/263; 382/264; 382/302
[58] Field of Search .................................. 382/260, 264, 382/302, 263, 254, 275, 276, 303, 304; 348/608

[56] References Cited

U.S. PATENT DOCUMENTS 4,792,854  12/1988  Glen ................................. 348/608
5,394,483   2/1995  Daly ................................. 382/270
5,517,581   5/1996  Johnston et al. ................. 382/254

*Primary Examiner*—Scott A. Rogers
*Attorney, Agent, or Firm*—William J. Burke

[57] ABSTRACT

A method and apparatus for assessing the visibility of differences between two input image sequences for improving image fidelity and visual task applications. The apparatus comprises a visual discrimination measure having a retinal sampling section, a plurality of temporal filters and a spatial discrimination section. The retinal sampling section applies a plurality of transformations to the input image sequences for simulating the image-processing properties of human vision. The temporal filters separate the sequences of retinal images into two temporal channels producing a lowpass temporal response and a bandpass temporal response. The spatial discrimination section applies spatial processing to the temporal responses to produce an image metric which is used to assess the visibility of differences between the two input image sequences.

25 Claims, 6 Drawing Sheets

METHODS AND APPARATUS FOR ASSESSING THE VISIBILITY OF DIFFERENCES BETWEEN TWO IMAGE SEQUENCES

This invention was made with U.S. government support under contract numbers NAS2-13869 and NAS2-13525. The U.S. government has certain rights in this invention.

This application claims the benefit of U.S. Provisional Application No. 60/014,271 filed Mar. 29, 1996.

The present invention relates to an apparatus and concomitant method for evaluating and improving the performance of imaging systems. More particularly, this invention relates to a method and apparatus that assesses the visibility of differences between two image sequences for improving image fidelity and performance in visual task applications.

BACKGROUND OF THE INVENTION

Designers of imaging systems often assess the performance of their designs in terms of physical parameters such as contrast, resolution and bit-rate efficiency in compression/decompression (codec) process. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image.

For example, an input image can be processed using two different codec algorithms to produce two different codec images. If the measure of codec image fidelity is based purely on parameters such as performing mean squared error (MSE) calculations on both codec images without considering the psychophysical properties of human vision, the codec image with a lower MSE value may actually contain more noticeable distortions than that of a codec image with a higher MSE value.

Over the years, various human visual performance models were used to improve imaging system design. One model (known as the Carlson and Cohen model) decomposes an input image by partitioning its one-dimensional power spectrum into a number of discrete adjacent frequency band. The integral of the amplitude values within each band is then subjected to a static non-linearity that is accelerating for small input values and compressive for large values. Changes in the output of this process from one member of a pair of images to the other provide a simple perceptual measure of the visibility of differences between the two images.

Another similar method is the square root integral model (SQRI). In this model, the separate frequency-selective bands are replaced by a single integral over spatial frequencies, based on the ratio between the modulation transfer function of the display and an arithmetic approximation to the contrast sensitivity function of the human observer. Although the SQRI has been successfully applied to a number of different display evaluation problems, this model and other basic psychophysics models are spatially one-dimensional. Namely, these models predict sensitivity to spatial variation in one dimension only.

Therefore, a need exists in the art for a method and apparatus for assessing the effects of physical parameters on the subjective visual performance of an imaging system. Specifically, a need exists for a method and apparatus for assessing the visibility of differences between two sequences of time-varying visual images.

SUMMARY OF THE INVENTION

The present invention is a method and apparatus for assessing the visibility of differences between two input image sequences for improving image fidelity and visual task applications. The apparatus comprises a visual discrimination measure having a retinal sampling section, a plurality of temporal filters and a spatial discrimination section.

The retinal sampling section applies a plurality of transformations to the input image sequences for simulating the image-processing properties of human vision. The retinal sampling section converts the input images to retinal images.

The temporal filters then separate the sequences of retinal images into two temporal channels producing a lowpass temporal response and a bandpass temporal response. Next, the spatial discrimination section applies spatial processing to the images to produce an image metric which is used to assess the visibility of differences between the two input image sequences.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
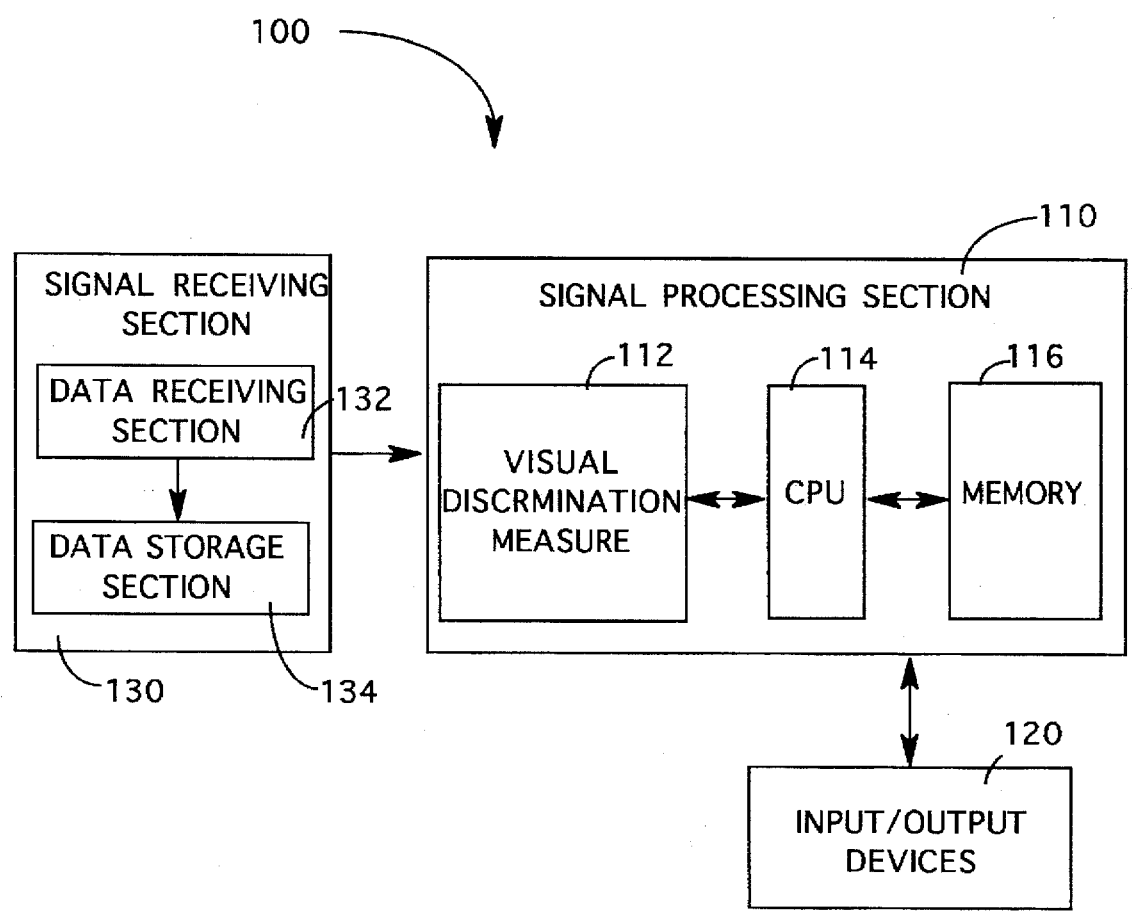
FIG. 1 illustrates a block diagram of a signal processing system of the present invention.

FIG. 1 depicts a signal processing system 100 that utilizes the present invention. The signal processing system consists of a signal receiving section 130, a signal processing section 110 and input/output devices 120.

Signal receiving section 130 serves to receive input data signals, such as sequences of images from imaging devices. Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line or other communication channels, while an analog-to-digital converter converts analog signals into a digital form. Hence, signal receiving section 130 may receive input signals "on-line" or in "real-time" and, if necessary, convert them to a digital form from a number of devices such as a computer, a camera, a video camcorder or various medical imaging devices.

The data storage section 134 serves to store input signals received by data receiving section 132. Data storage section 134 may incorporate a number of devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having a visual discrimination measure 112, a central processing unit (CPU) 114 and a memory 116 to facilitate image processing. The visual discrimination measure 112 can be a physical apparatus constructed from various filters which is coupled to the CPU through a communication channel. Alternatively, the visual discrimination measure 112 can be implemented as a software application residing in the memory 116 of the signal processing section.

The signal processing section 110 is also coupled to a plurality of input and output devices 120 such as a keyboard, a mouse, a video monitor or storage devices including but not limited to a hard disk drive or a compact disk drive. The input devices serve to provide inputs to the signal processing section for processing the input images, while the output devices serve to display or record the results.

The visual discrimination measure 112 assesses the visibility of differences between two sequences or streams of input images and generates an objective "just-noticeable difference" (JND) image metric. This metric can be expressed as a JND value, a JND map for each pair of input images or a probability prediction. In turn, the CPU may utilize the JND image metric to optimize various processes including, but not limited to, digital image compression, image quality measurement and target detection.

Figure 2:
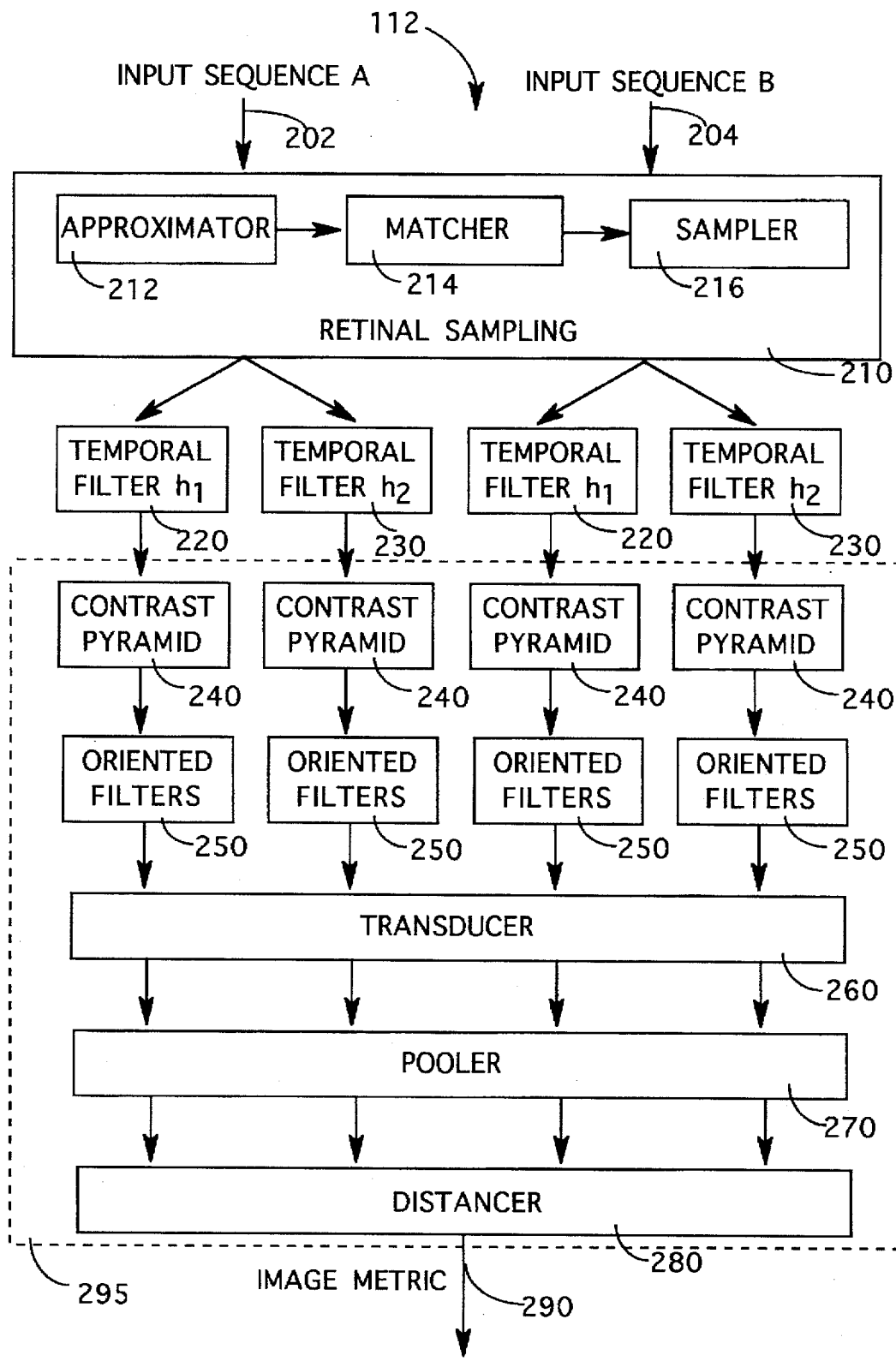
FIG. 2 illustrates a block diagram of the structure of the visual discrimination measure.

FIG. 2 depicts a block diagram of the structure of the visual discrimination measure 112. The visual discrimination measure comprises a retinal sampling section 210, a plurality of temporal filters 220 and 230, and a spatial discrimination section 295. The spatial discrimination section (spatial discriminator) comprises a plurality of contrast pyramid filters 240, a plurality of optional oriented filters 250, a transducer section 260, a pooling section 270 and a distance section 280.

The retinal sampling section (retinal sampler) 210 receives and processes a plurality of stimuli to produce retinal sampled image sequences. Namely, the retinal sampling section resamples the stimuli to simulate the sampling process of a human eye. The retinal sampling section 210 comprises an approximator 212, a matcher 214 and a sampler 216.

In the preferred embodiment, the stimuli are two digitized sequences of images, input sequence A 202 and input sequence B 204. The input sequences represent time frames of sampled luminance distributions on a planar surface, i.e., as would be returned from a photometer sampling from a uniform grid of closely spaced points on the surface of a display device. For example, sequence A may comprise original images while sequence B may comprise the codec images of sequence A. The input images are convolved by the approximator 212 with a function approximating the point spread produced by the optics of the eye. This function is expressed as:

$$Q(\rho)=0.952\exp(-2.59|\rho|^{1.36})+0.048\exp(-2.43|\rho|^{1.74}) \quad (1)$$

where $\rho$ is distance in minutes of arc (expressed in visual angle) from a point of light (measured in the plane of the image, whose normal is assumed to be the principal ray of the eye's optics), and $Q(\rho)$ is the intensity of light at a distance $\rho$, relative to the maximum. This function is disclosed by G. Westheimer in "The Eye As An Optical Instrument" in *Handbook of Perception and Human Performance* (1986).

The retinal sampling section 210 may also receive as input, a number of optional parameters relating to illuminance in the ambient environment, the physical size of the input images and the observer's fixation state. More specifically, these parameters include the physical distance between sample points on the input images (in mm), the frame rate (in Hz), the distance of the modeled observer from the image plane (in mm), the fixation depth (in mm defaulted to the viewing distance) and the eccentricity of the images in the observer's visual field (in degrees, defaulted to zero). These parameters are generally set with reasonable default unless otherwise specified.

The retinal sampling section 210 further comprises an optional matcher 214 for performing an optional operation on the input images if the fixation depth does not match the image depth. Image depth is the actual distance from the focal center of the eye to the image. Fixation depth is the distance at which the observer is fixating his/her eyes. Thus, if an image depth is set at a distance of 30 inches, then a viewer looking at the same image at a distance (fixation depth) of 60 inches, may perceive the image with a slight blur. Thus, in order to account for changes in effective image resolution with changes in the difference between image depth and fixation depth, geometrical optics is used to calculate the size of the blur circle, i.e., default diameter of the blur circle is zero. Calculation of blur circle radius is as follows: if fixation depth is $D_F$, viewing distance to the screen is D, the depth of the retina from the pupil is $D_i$ and pupil diameter is d, then the blur circle radius r is given by d/2 times the absolute value of $(D_i-D_i')$ divided by $D_i$. The parameter $D_i'$ is the distance of the retina from the pupil that would render the screen completely in focus, where $D_i'$ is given by the thin-lens formula $(1/D_i'=1/D_i+1/D_F-1/D)$. This calculation requires knowledge of the distance $D_i$ from the pupil to the imaging surface (i.e., the retina), taken as 20.3 mm from Westheimer (1986). The calculation also requires an estimate of pupil size, which is derived from the pupil diameter method of an accompanying provisional patent application filed simultaneously herewith on Mar. 29, 1996 with a Ser. No. 60/014274.

The area of densest photoreceptor sampling on the retina is the fovea, covering approximately the central two (2) degrees around the point of fixation. In this region, the linear photoreceptor density is approximately 120 retinal cones per degree. A retinal cone is a specific type of receptor in the retina. To simulate this sampling process of the human eye, the retinal sampling section 210 incorporates a sampler 216 to apply Gaussian convolution and point sampling sequence of operations. Namely, the input image is sampled at a density of 120 pixels per degree of visual angle to generate a "retinal image" of 512×512 pixels for "foveal viewing".

The linear density of photoreceptors declines as a roughly linear function of eccentricity. To simulate this effect, the sampler 216 is applied, where the sampling density for "non-foveal viewing" is calculated from the expression:

$$d=\frac{120}{1+ke} \quad (2)$$

where d is the calculated density, e is the eccentricity in degrees, and k is a parameter set at 0.4, where the value is estimated from psychophysical data disclosed by A. Watson in "Detection And Recognition Of Simple Spatial Forms", in *Physical and Biological Processing of Images* (1983). Effectively, the output images from the retinal sampling section simulate those images that are generated from a human retina when viewing the input sequences A and B.

Next, the visual discrimination measure 112 incorporates a plurality of temporal filters 220 and 230 to separate each input sequence of images into two different channels. Two temporal filters, labeled $h_1$ 220 and $h_2$ 230 in FIG. 2, are used to separate each input sequence into a lowpass (sustained channel) temporal response and a bandpass (transient channel) temporal response. Other temporal filters with different analytic forms can be employed with the condition that the basic lowpass and bandpass shapes are maintained. In the preferred embodiment, the lowpass temporal and bandpass temporal filters can be expressed respectively as:

$$h_1(t) = \lambda e^{-\lambda t} u(t) \tag{3}$$

$$h_2(t) = \mu(\mu t)^n \left[ \frac{1}{n!} - \frac{(\mu t)^2}{(n+2)!} \right] e^{-\mu t} u(t) \tag{4}$$

where u(t) is the unit step function, µ is a positive real, 84.14 Hz, and λ is 5.2 Hz and n is an integer set at 3 or 5 (preferred value is 3). The filter $h_2(t)$ is disclosed by Adelson and Bergen, *J. Opt. Soc. Am.* A 2, 291 (1985). Alternatively, the bandpass filter 230 as defined in Equation 4 above, can be implemented by taking a difference of two lowpass filters.

Effectively, the sustained channel blurs the input stream temporally, but provides relatively good spatial resolution. Thus, the output of this channel is ideal for looking at fine details. Conversely, the transient channel blurs the input stream spatially, but provides good temporal resolution which is ideal to detect motion in the input sequence. As illustrated in FIG. 2, each of the two input sequence outputs from the retinal sampling section is passed as input to each of the two temporal filters 220 and 230, to generate four image streams for input to the contrast pyramid transforms 240.

After the temporal filtering, each of the resulting raw luminance signals from the temporal filters is received and converted by a contrast transform 240 to units of local contrast. Namely, a "contrast pyramid" is generated by decomposing the 512×512 retinal image into Gaussian and Laplacian pyramids. First, each image is decomposed into a Laplacian pyramid as disclosed by P. J. Burr and E. H. Adelson in "The Laplacian pyramid as a compact image code", *IEEE Transactions on Communications* (1983). In the preferred embodiment, the image is decomposed into a set of seven (7) frequency channels or bandpass (pyramid) levels with peak frequencies ranging from 32 through 0.5 cycles/degree. Each level is separated from its neighbors by one octave, i.e., 32, 16, 8, 4, 2, 1 and 0.5. Then, at each point in each level, the Laplacian value is divided by the corresponding point upsampled from the Gaussian pyramid level two levels down in resolution. Namely, to compute the local contrast at each level of the pyramid, a Laplacian (bandpass) pyramid is generated by subtracting from each Gaussian level a one-level-blurred copy of itself; the result is divided by a two-level-blurred copy. Mathematically, this contrast pyramid operation can be expressed (in the continuous domain) as:

$$\hat{c}_k(\vec{x}) = \frac{I(\vec{x})*(G_k(\vec{x}) - G_{k+1}(\vec{x}))}{I(\vec{x})*G_{k+2}(\vec{x})}, \tag{5}$$

where $\hat{c}_k(\vec{x})$ is the contrast at pyramid level k, (time t is suppressed), $\vec{x}$ is a two-dimensional position vector, $I(\vec{x})$ is the input image from the temporal filter, and where $G_k(\vec{x})$ is a Gaussian convolution kernel expressed as:

$$G_k(\vec{x}) = \frac{1}{(\sqrt{2\pi}\ \sigma_k)^2} e^{-(x^2+y^2)/2\sigma_k^2} \tag{6}$$

for which $\sigma_k = 2^{k-1}\sigma_0$, where $\sigma_0$ is the distance between adjacent foveal photoceptors, measured in the same unit as in x and y. The result of this contrast pyramid operation is a local difference divided by a local mean, i.e., a local measure of contrast, localized in both space and frequency. Namely, the result is a measure of the magnitude of local change divided by the local mean for a number of different scales separated from each other by one octave. For a sine grating within the frequency passband of one pyramid level, the resulting contrast measure is approximately equivalent to the Weber contrast, i.e., $(L_{max}-L_{min})/L_{mean}$, where $L_{max}$, $L_{min}$, and $L_{mean}$ refer respectively to the maximum, minimum, and mean luminance of the grating pattern. This contrast pyramid operation is applied identically to values coming from both temporal filtering channels. A similar process for implementing the contrast pyramid calculation is disclosed by E. Peli in "Contrast in complex images", *J. Opt. Soc. Am.* (1990). Furthermore, although the preferred embodiment incorporates a contrast pyramid having seven levels, the present invention can be modified by using contrast pyramids with any number of levels and/or other peak frequency ranges.

Since the complexity of spatial filtering may vary with the speed vs. accuracy requirements of a particular application, the square of each contrast pyramid output pixel is generally normalized by the value $1/H_{kn}$, which is close to the grating contrast detection threshold for that temporal channel, pyramid level and local luminance. Denoting the pyramid level by k (k=1, ... 7 from finest to coarsest resolution), and the temporal channels by n (n=1, 2) sustained and transient channels respectively, then $H_{k1}$ are given the following default values: (12.48, 3.197, 361.8, 396.3, 227.2, 4.573, 5.573), $H_{k2}$ are given as (2.02, 57.36, 202.58, 324.39, 483.09, 608.39, 597.50). These values effectively cause the transient channel to have a coarse spatial resolution, and vice versa. The values, determined by calibration described below, are generally functions of average retinal illumination B, but default to values corresponding to B=200 trolands. Two options are considered here:

(1) if orientation tuning is not chosen, then normalized outputs $\hat{e}_{k,n}(\vec{x},t)$ are computed as:

$$\hat{e}_{k,n}(\vec{x},t) = H_{kn}(\hat{c}_{k,n}(\vec{x},t))^2 \tag{7}$$

(2) if orientation tuning or filtering is chosen, then each level of the contrast pyramid is received and convolved with a set of four (4) pairs of spatially oriented filters 250 to produce a spatially oriented output.

Figure 6:
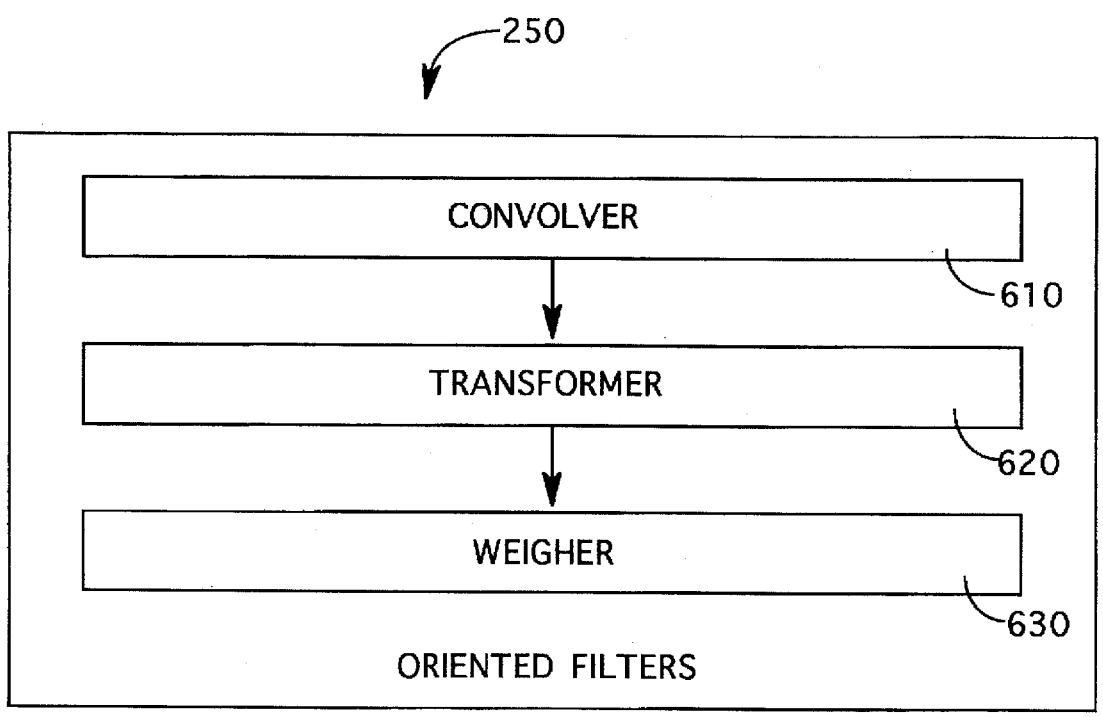
FIG. 6 illustrates a block diagram of oriented filters of the present invention.

FIG. 6 illustrates a block diagram of the oriented filters 250 which comprises a convolver 610, a transformer 620 and a weigher 630. The convolver 610 comprises a plurality of spatially oriented filter pairs, where each pair of filters consists of a directional second derivative of a Gaussian (in one of the four directions horizontal, vertical and the two diagonals) and its Hilbert transform. These filters contain a log bandwidth at half height of approximately 0.7 octaves, a value within the range of bandwidths inferred psychophysically by A. Watson in "Summation of grating patches indicates many types of detectors at one retina location", *Vision Res.* 22 (1982). In the preferred embodiment, the orientation bandwidth of these filters (i.e., the range of angles over which filter output is greater than one half the maximum) is approximately 65 degrees. This figure is slightly larger than the 40 degree tuning of monkey simple cells reported by DeValois et al. in "The Orientation And Direction Selectivity Of Cells In Macaque Visual Cortex", *Vision Res.* 22 (1982) 531–544, and the 30 to 60 degree range reported psychophysically by Phillips and Wilson in "Orientation Bandwidths Of Spatial Mechanisms Measured By Masking", *J. Opt. Soc. Am.* [A]1 (1984) 226–232.

Alternatively, spatially oriented filters with smaller bandwidths can be employed, but additional filters will be required to uniformly cover the range of orientations, which leads to a computationally expensive, slower, but more accurate process. Thus, although prediction accuracy on some orientation masking data may be degraded, employing filters having four (4) orientations provides a good balance between performance and cost. However, those skilled in the art will realize that the number of filters in the present invention can be adjusted to tailor to the requirements of a specific application. In the present invention, the spatially oriented filters are implemented by using the steerable filters of W. T. Freeman and E. H. Adelson in "The Design And Use Of Steerable Filters", *IEEE Transactions on Pattern Analysis and Machine Intelligence* 13 (1991) 891–906.

After oriented filtering, the corresponding Hilbert pairs of filter output images are squared and summed by the transformer 620, resulting in a phase-independent energy response:

$$e_{k,n,\theta}(\vec{x},t) = (o_{k,n,\theta}(\vec{x},t))^2 + (h_{k,n,\theta}(\vec{x}(\vec{x},t)))^2 \quad (8)$$

where $\theta$ indexes over the 4 orientations, n indexes over the two temporal channels, k is pyramid level, and o and h are the oriented operator and its Hilbert transform. This operation attempts to simulate a widely proposed transformation in the mammalian visual cortex from a linear response among simple cells to an energy response among complex cells. The phase independence resulting from this operation provides some useful properties, e.g., it causes the visual discrimination measure 112 to be less sensitive to the exact position of an edge, a property exhibited in human psychophysical performance.

Next, each energy response or measure is received and normalized by $H_{k,n}$ of the weigher 630 as discussed above for equation (7). The result is a set of values $\hat{e}_{k,n}(\vec{x},t)$ with an additional index $\theta$ for each orientation channel which is expressed as:

$$\hat{e}_{k,n,\theta}(\vec{x},t) = H_{kn} e_{k,n,\theta}(\vec{x},t). \quad (9)$$

This ends orientation tuning option (2).

Thus, if option (1) is selected, the oriented filters 250 as illustrated in FIG. 2 are replaced by a weigher for producing normalized outputs $\hat{e}_{k,n}(\vec{x},t)$ in accordance with equation (7).

Next, the transducer section (transducer) 260 applies a sigmoid non-linearity to each of the normalized energy measures to produce a transducer output. The sigmoid non-linearity is expressed as:

$$T(y) = \frac{y^{1.8}}{0.315 y^{1.65} + 6.8} \quad \text{where } y = \hat{e}_{kn\theta}(\vec{x},t) \quad (10)$$

The sigmoid non-linearity is applied to reproduce the dipper shape of contrast discrimination functions as disclosed by J. Nachmias and R. V. Sansbury in "Grating Contrast: Discrimination May Be Better Than Detection", *Vision Res.* 14 (1974) 1039–1042.

The spatially oriented filters described above have the property that, for a single filter at a single spatial position given a sine grating to which it is optimally tuned, the output as a function of number of cycles in a patch will asymptote at little more than one cycle. In contrast, foveal human sensitivity continues to improve as the number of cycles in the patch continues to increase to around 5 as disclosed by J. Hoekstra et al. in "The Influence Of The Number Of Cycles Upon The Visual Contrast Detection Threshold For Spatial Sinewave Patterns", Vision Research 14 (1974) 365–368.

To account for this effect, the visual discrimination measure 112 may include an optional pooling section (pooler) 270. For foveal inputs, the pooling section receives and averages the transducer outputs over a small "neighborhood" 0 by convolving with a squared-shaped kernel of foveal ($d_0$) of 5 to produce a pooled output. Namely, the small neighborhood is defined as a 5-by-5 kernel (5-by-5 photoreceptor space, i.e., retinal pixels) around each point on the transducer outputs.

For stimulus eccentricities outside the fovea, the diameter $d_p$ of this kernel increases as a linear function of eccentricity, according to the expression:

$$d_p = d_0 \left( 1 + \frac{e}{k_p} \right) \quad (11)$$

where $d_0$ is the reveal diameter (5.0), e is the eccentricity in degrees (default to zero degrees) and $k_p$ is a scaling factor. This eccentricity dependent increase in pooling is needed to simulate an eccentricity dependent loss in performance, beyond that attributable to a loss in contrast sensitivity, on tasks requiring accurate relative localization of stimulus features, such as character discrimination.

After the pooling operation, each spatial position of each image is equivalent to an m-dimensional vector, where m is the number of pyramid levels times the number of orientations. These vectors are received by the distance section (distancer) 280 where the distance between these vectors for the two input images is calculated. First, the smaller pyramid levels are upsampled to the full 512×512 size, where the result is a set of m arrays $p_i(\vec{x})$ (where i indexes from 1 to m) for each input image $\vec{x}$. From these, a distance measure D is calculated as follows:

$$D(\vec{x}_1,\vec{x}_2) = \left\{ \sum_{i=1}^{m} [P_i(\vec{x}_1) - P_i(\vec{x}_2)]^Q \right\}^{1/Q} \quad (12)$$

where $\vec{x}_1$ and $\vec{x}_2$ are the two input images, and Q is a parameter set at 2. (For Q=2, this expression corresponds to the Euclidean distance between the two vectors.) The output of the distance section 280 is an image metric 290. More specifically, the output is a spatial array of distance values or JND values, which can then be used to create a JND map for a pair of corresponding input images, i.e., one from input sequence A and one from input sequence B.

Using the JND map, a plurality of other image metrics can be generated based on statistics computed from the JND maps. Generally, the values across the JND map can be combined according to a similar distance metric as described above. In practice, one of two different combinations is employed, e.g., the average across the map or the maximum. For threshold discrimination tasks, the latter is the more useful statistic, while for image quality rating tasks, the former is the more useful statistic.

Thus, the JND value output can be converted to a probability value. The actual probability values on the JND maps are calibrated in terms called JNDs, where 1 JND corresponds to a 75% probability that an observer viewing the two input images multiple times would be able to see the difference. JNDs above 1 are then calculated incrementally.

Although the visual discrimination measure 112 utilizes the spatial discrimination section 295 in the preferred embodiment, the present invention is not limited to this specific implementation. Other spatial discrimination devices or methods can be incorporated into the present invention to achieve similar results. To illustrate, the complexity of the spatial discrimination section 295 can be reduced by removing the spatially oriented filters. A more dramatic simplification replaces a substantial portion of the spatial discrimination section with a simple mean squared error calculation. For some applications, the simplifications would produce little noticeable decrement in accuracy, but the system may benefit from a significant improvement in performance. Similarly, the various transformations performed by the retinal sampling section 210 (or the entire retinal sampling section 210) can also be omitted or modified to minimize the complexity of the visual discrimination measure 112.

Furthermore, although the present invention describes a plurality of temporal filters, contrast pyramid transforms, and oriented filters, those skilled in the art will realize that the visual discrimination measure can be simplified by reducing the number of filters. To illustrate, multiplexers can be used to share the temporal filters 220 and 230, the contrast pyramid transform 240 and the oriented filters 250.

Furthermore, the visual discrimination measure 112 is able to generate many accurate predictions without any readjustment of its parameters. To achieve this robustness, calibration of the visual discrimination measure is performed in a two step method, illustrated in FIGS. 3 and 4. The calibration method assumes that the shape of the transducer function is independent of pyramid level or orientation channel, except for a scale factor that sets the gain as a function of frequency band.

Figure 3:
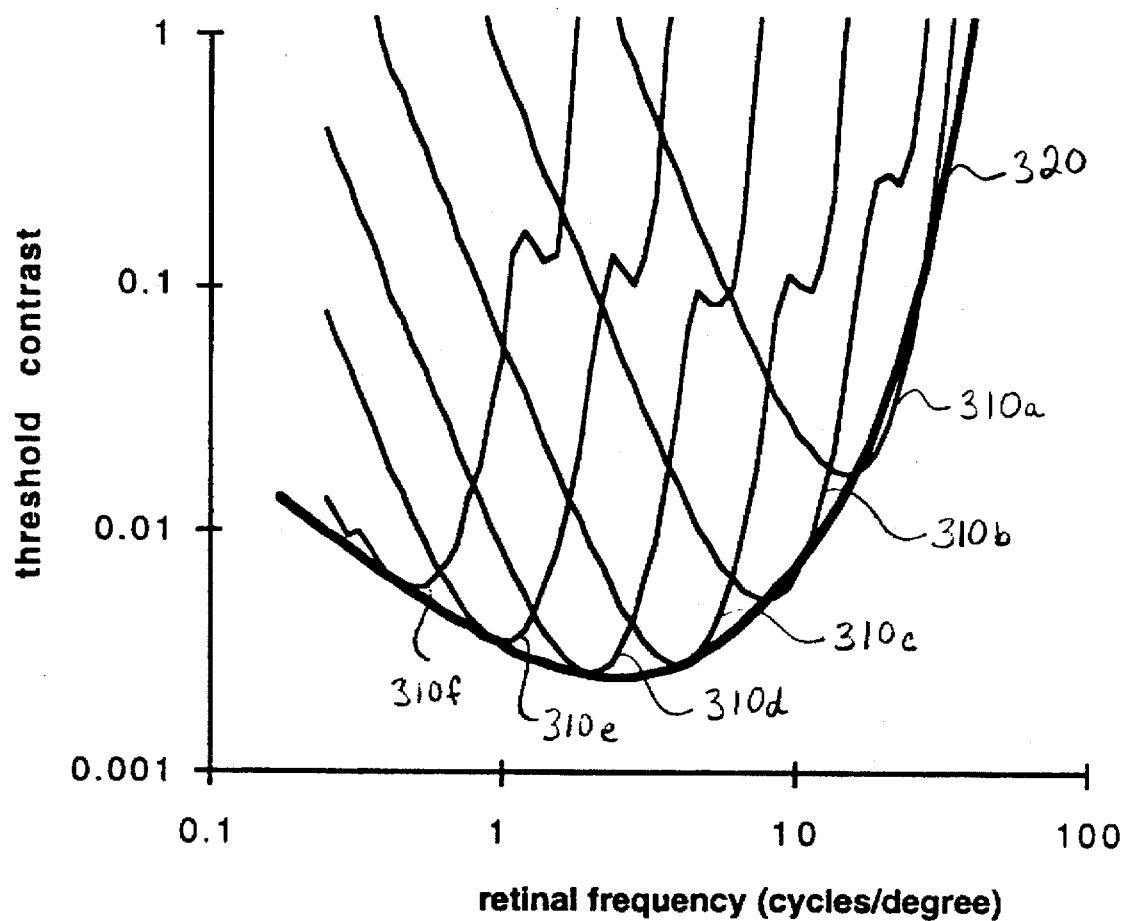
FIG. 3 illustrates a graph showing sensitivity adjustment of pyramid levels to achieve fit to a contrast sensitivity function.

FIG. 3 illustrates the first calibration step which is based on a fit to the spatial contrast sensitivity function, as measured by O. H. Schade in "Electro-Optical Characteristics Of Television Systems", *RCA Review* 9 (1948) 5–37. In a contrast sensitivity measurement, the contrast of a grating pattern of a fixed spatial frequency is adjusted until the grating is just detectable. The threshold contrast measurement is repeated at a number of different spatial frequencies, so that the results can be plotted as a function of spatial frequency. Thus, each of the u-shaped curves $310a$–$310f$ represents the spatial frequency response of one of the pyramid level as discussed above. The bold curve 320 represents the sensitivity data or contrast sensitivity function of the eye of a human being.

More specifically, for each spatial frequency, the contrast of the grating is adjusted until the maximum response from the oriented filter stage for that pyramid level is exactly 1. The results of such computation for each pyramid level are shown by the set of thinner lined curves $310a$–$310f$ in FIG. 3. These curves are shifted up and down by changing the value of the contrast normalization term $H_{kn}$ for each pyramid level. Thus, the first step of the calibration process adjusts the values of $H_{kn}$ to shift the curves up or down until their combined envelope produces the best possible fit to the overall contrast sensitivity function. The fit shown in FIG. 3 is the result of such an optimization method as applied to the spatial version of the vision model. For the spatiotemporal version, the data of F. L. van Nes et al., "Spatiotemporal Modulation Transfer In The Human Eye", *J. Opt. Soc. Am.* 57, 1082–1088 (1967) and J. J. Koenderink et al., "Spatiotemporal Contrast Detection Threshold Surface Is Bimodal", *Optics Letters* 4, 32–34 (1979) was used in an analogous procedure.

Figure 4:
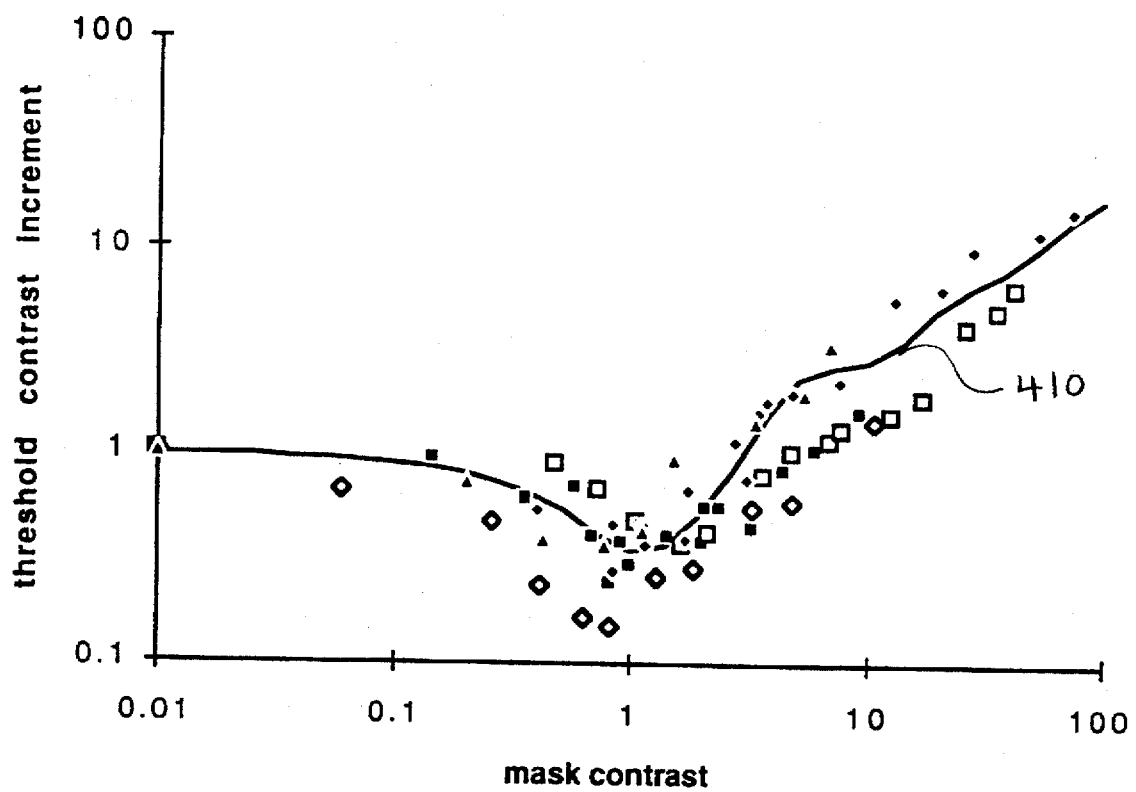
FIG. 4 illustrates a graph showing predictions of the visual discrimination measure on contrast discrimination data of A. Bradley and I. Ohzawa in "A Comparison Of Contrast Detection And Discrimination", *Vision Res.* 26 (1986) 991–997, showing fit of transducer parameters.

The second step of the calibration method is based on the contrast discrimination results of A. Bradley and I. Ohzawa in "A Comparison Of Contrast Detection And Discrimination", *Vision Res.* 26 (1986) 991–997. FIG. 4. illustrates a contrast discrimination calculation, where a just detectable change in grating contrast is measured as a function of the starting contrast of that grating. The contrast discrimination data plotted in FIG. 4 represent different spatial frequencies. Both the threshold contrast change (ordinate values) and starting contrast (abscissa values) have been normalized by the contrast detection threshold for that grating. The resulting curves for different spatial frequencies (as indicated by the different symbol types) overlaps to produce a bold curve 410, thereby indicating that a single transducer section can be used for all pyramid levels, after the normalization adjustments described in the first calibration step. Thus, only a single set of transducer parameters needs to be adjusted, thereby simplifying and enhancing the robustness of the fitting method.

Figure 5:
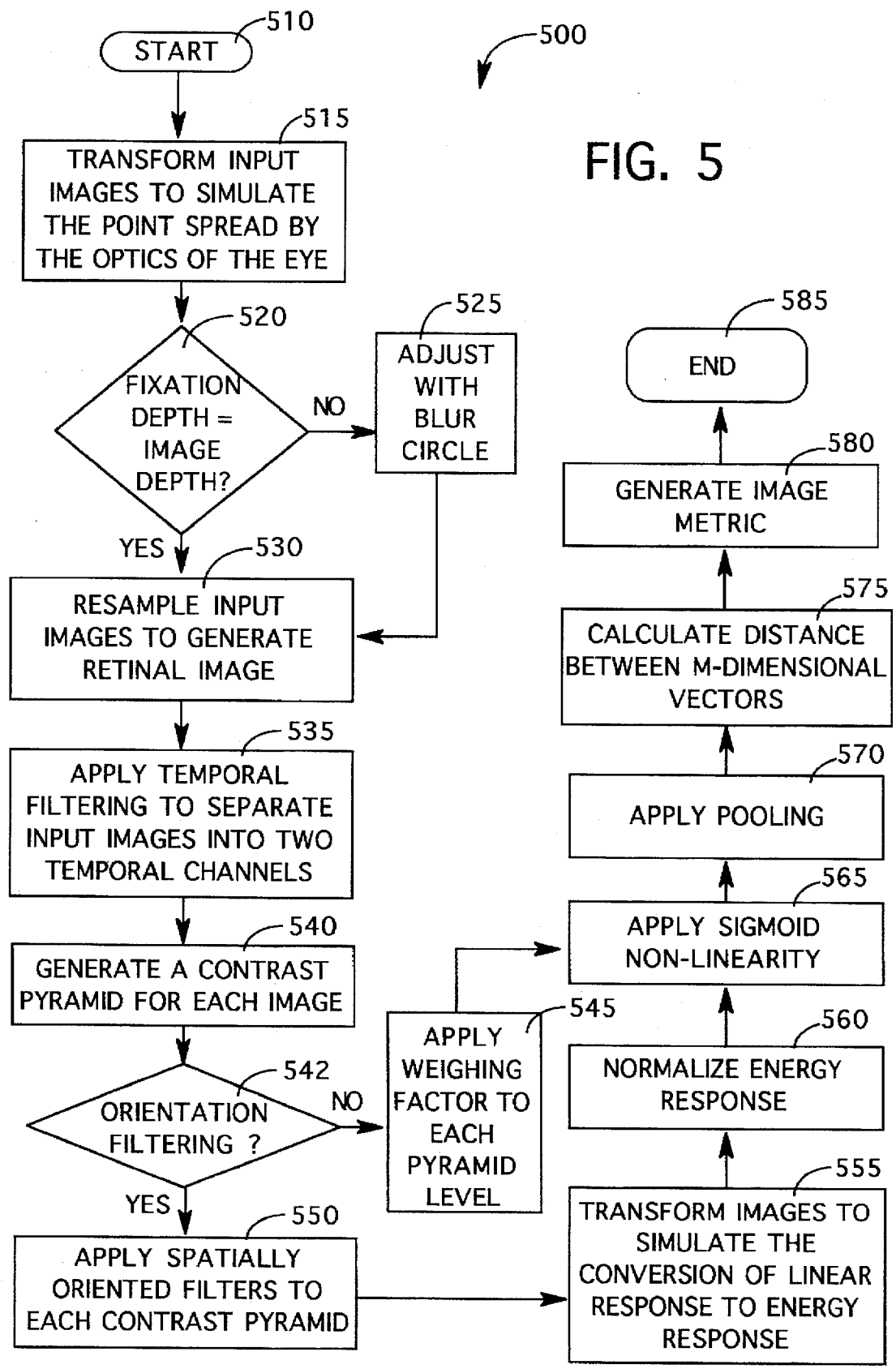
FIG. 5 illustrates a flowchart of a method for assessing the visibility of differences between two input image sequences.

FIG. 5 illustrates a method 500 for assessing the visibility of differences between two input image sequences for improving image fidelity and visual task applications. Method 500 begins at step 510 and proceeds to step 515 where the input image sequences are received and transformed prior to sampling. The input images are convolved with the function of equation (1) for approximating the point spread by the optics of the eye.

In step 520, the method determines whether the fixation depth is equal to the image depth. If the decision is affirmatively answered, then method 500 proceeds to step 530 where the input images are resampled to generate retinal images. If the decision is negatively answered, method 500 proceeds to step 525 where a "blur circle" is calculated and convolved with the input images to account for changes in effective image resolution with changes in the difference between image depth and fixation depth.

In step 530, the sampling process attempts to simulate the sampling process of the human eye. Effectively, each input image is sampled at a density of 120 pixels per degree of visual angle to generate a "retinal image" of 512×512 pixels for "foveal viewing". For "non-foveal-viewing", step 530 samples the input image at a density in accordance with equation 2.

In step 535, temporal filtering is applied to the retinal images to separate each input image into two temporal channels, a sustained channel and a transient channel. The sustained channel contains a lowpass temporal response while the transient channel contains a bandpass temporal response of the input image sequence. The functions of the two temporal filters are expressed in equations (3) and (4).

In step 540, a contrast pyramid is generated by decomposing each image generated from step 535. Each contrast pyramid contains seven frequency channels or pyramid levels.

In step 542, method 500 determines whether orientation filtering is selected. If the query is negatively answered, method 500 proceeds to step 545. If the query at step 542 is affirmatively answered, method 500 proceeds to step 550 where orientation filtering is applied.

In step 545, a weighing factor is then applied to each pyramid level to account for the contrast sensitivity function of the human eye. The weighing factors are calculated by changing the value of the contrast normalization term $H_{kn}$ for each pyramid level and temporal channel. The adjustment of the values of $H_{kn}$ is used in conjunction with FIG. 3 to shift the curves 310a–310f up or down until their combined envelope produces the best possible fit to the overall contrast sensitivity function. Method 500 then proceeds to step 565 where a sigmoid non-linearity is applied to the normalized energy response in accordance with equation (10).

In step 550, spatially oriented filters are applied to each contrast pyramid where the output images are then transformed in step 555 in accordance with equation (8) to simulate the conversion of linear response among simple cells to an energy response among complex cells in the mammalian visual cortex.

In step 560, the energy response is then normalized in accordance with equation (9) and a sigmoid non-linearity is applied to the normalized energy response in step 565 in accordance with equation (10).

In step 570, a pooling operation is applied to the outputs from step 565. The pooling operation averages the energy response over a small neighborhood by convolving with a disc-shaped kernel of a certain diameter size. For stimulus eccentricities inside of the fovea, the "foveal" diameter is set at 5. For stimulus eccentricities outside of the fovea, the diameter $d_p$ is calculated in accordance with equation (11). After the pooling operation, each spatial position of each image is equivalent to an m-dimensional vector.

In step 575, the distance between these vectors for two corresponding input images is calculated. Smaller pyramid levels are upsampled to the full 512×512 size and the distance is calculated in accordance with equation (12) to produce a spatial array of distance values.

In step 580, spatial array of distance values can be used to generate various image metrics such as a JND map or a probability prediction. Method 500 then ends in step 585.

There has thus been shown and described a novel method and apparatus for assessing the visibility of differences between two input image sequences for improving image fidelity and visual task applications. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. An apparatus for assessing visibility of differences between two input image sequences, said apparatus comprising:

a temporal filter for filtering each of the input image sequence into a lowpass temporal response and a bandpass temporal response; and a spatial discriminator, coupled to said temporal filter, for generating an image metric from said lowpass and bandpass temporal responses.

2. The apparatus of claim 1, further comprises:

a retinal sampler, coupled to said temporal filter, for sampling each of the input image sequence to produce a retinal sampled image sequence, where said retinal sampler simulates a sampling process of a human eye, where said input image sequence to said temporal filter is said retinal sampled image sequence.

3. The apparatus of claim 2, wherein said retinal sampler comprises:

an approximator for approximating optics of a human eye by convolving said input image sequence with a function expressed as $$Q(\rho)=0.952\exp(-2.59|\rho|^{1.36})+0.048\exp(-2.43|\rho|^{1.74})$$

where ρ is a distance in minutes of arc from a point of light, and Q(ρ) is an intensity of light at a distance ρ to produce a convolved output;

a matcher, coupled to said approximator, for matching a fixation depth with an image depth of said convolved output to produce a matched output; and a sampler, coupled to said matcher, for sampling said matched output at a density of 120 pixels per degree of visual angle for foveal viewing and for sampling said matched output for non-foveal viewing at a density in accordance with $$d = \frac{120}{1+ke}$$

where d is a calculated density, e is an eccentricity in degrees, and k is a constant.

4. The apparatus of claim 1, wherein said temporal filter comprises:

a first temporal filter, coupled to said spatial discriminator, for filtering said input image sequence into said lowpass temporal response; and a second temporal filter, coupled to said spatial discriminator, for filtering said input image sequence into said bandpass temporal response.

5. The apparatus of claim 4, wherein said first temporal filter is expressed as $$h_1(t) = \lambda e^{-\lambda t} u(t)$$

and said second temporal filter is expressed as $$h_2(t) = \mu(\mu t)^n \left[ \frac{1}{n!} - \frac{(\mu t)^2}{(n+2)!} \right] e^{-\mu t} u(t)$$

where u(t) is a unit step function, μ is a constant, λ is a consist and n is an integer.

6. The apparatus of claim 1, wherein said spatial discriminator comprises:

a contrast transform for computing a local contrast for each image of said lowpass and bandpass temporal responses.

7. The apparatus of claim 6, wherein said contrast transform generates a contrast pyramid having a plurality of levels for each image of said lowpass and bandpass temporal responses.

8. The apparatus of claim 7, wherein said contrast pyramid is expressed as $$\hat{c}_k(\vec{x}) = \frac{I(\vec{x}) * (G_k(\vec{x}) - G_{k+1}(\vec{x}))}{I(\vec{x}) * G_{k+2}(\vec{x})}$$

where $\hat{c}_k(\vec{x})$ is a contrast at pyramid level k, $\vec{x}$ is a two-dimensional position vector, $I(\vec{x})$ is an image from one of said first and second temporal filters, and where $G_k(\vec{x})$ is a Gaussian convolution kernel expressed as $$G_k(\vec{x}) = \frac{1}{(\sqrt{2\pi}\ \sigma_k)^2} e^{-(x^2+y^2)/2\sigma_k^2}$$

where $\sigma_k = 2^{k-1}\sigma_0$.

9. The apparatus of claim 7, wherein said spatial discriminator further comprises:
   a weigher, coupled to said contrast transform, for applying a weighing factor to each of said plurality of levels of said contrast pyramid to produce a normalized output.

10. The apparatus of claim 9, wherein said spatial discriminator further comprises:
   a transducer, coupled to said weigher, for applying a sigmoid non-linearity to said normalized output to produce a transducer output;
   a pooler, coupled to said transducer, for averaging said transducer output over a kernel of pixels to produce a pooled output; and
   a distancer, coupled to said pooler, for computing a distance between a plurality of m-dimensional vectors to produce said image metric, where each of said m-dimensional vectors represents a spatial position of each image of said pooled output.

11. The apparatus of claim 10, wherein said sigmoid non-linearity is expressed as $$T(y) = \frac{y^{1.8}}{0.315 y^{1.65} + 6.8} \text{ where } y = \hat{e}_{k,n,\theta}(\vec{x},t)$$

and wherein said kernel of pixels for eccentricities inside a fovea is a kernel of a foveal diameter ($d_0$) of 5 and wherein said kernel of pixels for stimulus eccentricities outside of said fovea, is a diameter $d_p$ of said kernel increasing as a linear function of eccentricity, according to the expression $$d_p = d_0 \left(1 + \frac{e}{k_p}\right)$$

where e is an eccentricity in degrees and $k_p$ is a scaling factor; and wherein said distance is calculated using a distance measure D according to the expression $$D(\vec{x_1},\vec{x_2}) = \left\{\sum_{i=1}^{m} [P_i(\vec{x_1}) - P_i(\vec{x_2})]^Q\right\}^{1/Q}$$

where m is a number of said levels of said contrast pyramid times a number of orientations, $P_i(\vec{x})$ is a set of m arrays (where i indexes from 1 to m) for each input image $\vec{x}$, where $\vec{x}_1$ and $\vec{x}_2$ are two input images of said input image sequences, and Q is a parameter.

12. The apparatus of claim 7, wherein said spatial discriminator further comprises:
   a spatially oriented filter, coupled to said contrast transform, for applying orientation tuning to each of said level of said contrast pyramid to produce a spatially oriented output;
   a transducer, coupled to said spatially oriented filter, for applying a sigmoid non-linearity to said spatially oriented output to produce a transducer output;
   a pooler, coupled to said transducer, for averaging said transducer output over a kernel of pixels to produce a pooled output; and
   a distancer, coupled to said pooler, for computing a distance between a plurality of m-dimensional vectors to produce said image metric, where each of said m-dimensional vectors represents a spatial position of each image of said pooled output.

13. The apparatus of claim 12, wherein said spatially oriented filter comprises a steerable filter.

14. The apparatus of claim 12, wherein said spatially oriented filter comprises:
   a convolver for convolving each level of said contrast pyramid with a set of four pairs of spatially oriented filters with each pair of spatially oriented filters comprising a directional second derivative of a Guassian and its Hilbert transform to produce a Hilbert filter output;
   a transformer, coupled to said convolver, for transforming said Hilbert filter output into an energy response in accordance with $$e_{k,n,\theta}(\vec{x},t) = (o_{k,n,\theta}(\vec{x},t))^2 + (h_{k,n,\theta}(\vec{x},t))^2$$

where $\theta$ indexes over four orientations of said four pairs of spatially oriented filters, n indexes over two channels of said temporal responses, k is a contrast pyramid level, and o and h are an oriented operator and its Hilbert transform; and
   a weigher, coupled to said transformer, for normalizing said energy response to produce said spatially oriented output.

15. A method of assessing visibility of differences between two input image sequences, comprising the steps of:
   (a) filtering each of the input image sequence into a lowpass temporal response and a bandpass temporal response; and
   (b) discriminating said lowpass and bandpass temporal responses to generate an image metric.

16. The method of claim 15, further comprising the steps of:
   (a') sampling each of the input image sequence to produce a retinal sampled image sequence, where said sampling simulates a sampling process of a human eye, where said input image sequence to said filtering step (a) is said retinal sampled image sequence.

17. The method of claim 16, wherein said sampling step (a') comprises the steps of:
   (a'1) approximating optics of a human eye by convolving said input image sequence with a function expressed as $$Q(\rho) = 0.952 \exp(-2.59|\rho|^{1.36}) + 0.048 \exp(-2.43|\rho|^{1.74})$$

where $\rho$ is a distance in minutes of arc from a point of light, and $Q(\rho)$ is an intensity of light at a distance $\rho$ to produce a convolved output;
   (a'2) matching a fixation depth with an image depth of said convolved output to produce a matched output; and
   (a'3) sampling said matched output at a density of 120 pixels per degree of visual angle for foveal viewing and sampling said matched output for non-foveal viewing at a density in accordance with $$d = \frac{120}{1+ke}$$

where d is a calculated density, e is an eccentricity in degrees, and k is a constant.

18. The method of claim 15, wherein said filtering step (a) comprises the steps of:

(a1) filtering said input image sequence into said lowpass temporal response in accordance with $h_1(t)=\lambda e^{-\lambda t}i(t)$; and (a2) filtering said input image sequence into said bandpass temporal response in accordance with $$h_2(t) = \mu(\mu t)^n \left[ \frac{1}{n!} - \frac{(\mu t)^2}{(n+2)!} \right] e^{-\mu t}u(t)$$

where u(t) is a unit step function, $\mu$ is a constant, $\lambda$ is a constant and n is an integer.

19. The method of claim 15, wherein said discriminating step (b) comprises the step of:
   (b1) computing a local contrast for each image of said lowpass and bandpass temporal responses.

20. The method of claim 19, wherein said computing step (b1) comprises the step of:
   generating a contrast pyramid having a plurality of levels for each image of said lowpass and bandpass temporal responses.

21. The method of claim 20, wherein said generating step is in accordance with $$\hat{c}_k(\vec{x}) = \frac{I(\vec{x})*(G_k(\vec{x}) - G_{k+1}(\vec{x}))}{I(\vec{x})*G_{k+2}(\vec{x})}$$

where $\hat{c}_k(\vec{x})$ is a contrast at pyramid level k, $\vec{x}$ is a two-dimensional position vector, $I(\vec{x})$ is an image resulting from one of said temporal filtering steps, and where $G_k(\vec{x})$ is a Gaussian convolution kernel expressed as $$G_k(\vec{x}) = \frac{1}{(\sqrt{2\pi}\,\sigma_k)^2} e^{-(x^2+y^2)/2\sigma_k^2}$$

where $\sigma_k = 2^{k-1}\sigma_0$.

22. The method of claim 20, wherein said discriminating step (b) further comprises the steps of:
   (b2) applying a weighing factor to each of said plurality of levels of said contrast pyramid to produce a normalized output;
   (b3) applying a sigmoid non-linearity to said normalized output to produce a transducer output;
   (b4) averaging said transducer output over a kernel of pixels to produce a pooled output; and
   (b5) computing a distance between a plurality of m-dimensional vectors to produce said image metric, where each of said m-dimensional vectors represents a spatial position of each image of said pooled output.

23. The method of claim 20, wherein said discriminating step (b) further comprises the steps of:
   (b2) applying orientation tuning to each of said level of said contrast pyramid to produce a spatially oriented output;
   (b3) applying a sigmoid non-linearity to said spatially oriented output to produce a transducer output;
   (b4) averaging said transducer output over a kernel of pixels to produce a pooled output; and
   (b5) computing a distance between a plurality of m-dimensional vectors to produce said image metric, where each of said m-dimensional vectors represents a spatial position of each image of said pooled output.

24. The method of claim 23, wherein said applying orientation tuning step (b2) comprises the steps of:
   convolving each level of said contrast pyramid with a set of four pairs of spatially oriented filters with each pair of spatially oriented filters comprising a directional second derivative of a Guassian and its Hilbert transform to produce a Hilbert filter output;
   transforming said Hilbert filter output into an energy response in accordance with $$e_{k,n,\theta}(\vec{x}_r,t) = (o_{k,n,\theta}(\vec{x}_r,t))^2 + (h_{k,n,\theta}(\vec{x}_r,t))^2$$

where $\theta$ indexes over four orientations of said four pairs of spatially oriented filters, n indexes over two channels of said temporal responses, k is a contrast pyramid level, and o and h are an oriented operator and its Hilbert transform; and normalizing said energy response to produce said spatially oriented output.

25. The method of claim 20, further comprises the step of:
   (c) calculating a plurality of weighing factors for said plurality of levels of said contrast pyramid by adjusting a contrast of a grating pattern of a fixed spatial frequency until said grating is just detectable; and
   (d) repeating step (c) for a number of different spatial frequencies, where each of said spatial frequency represents one level of said contrast pyramid.

* * * * *